(No Model.)
W. HOEFJEN.
Machine for Packing Boned Ham.
No. 234,983. Patented Nov. 30, 1880.
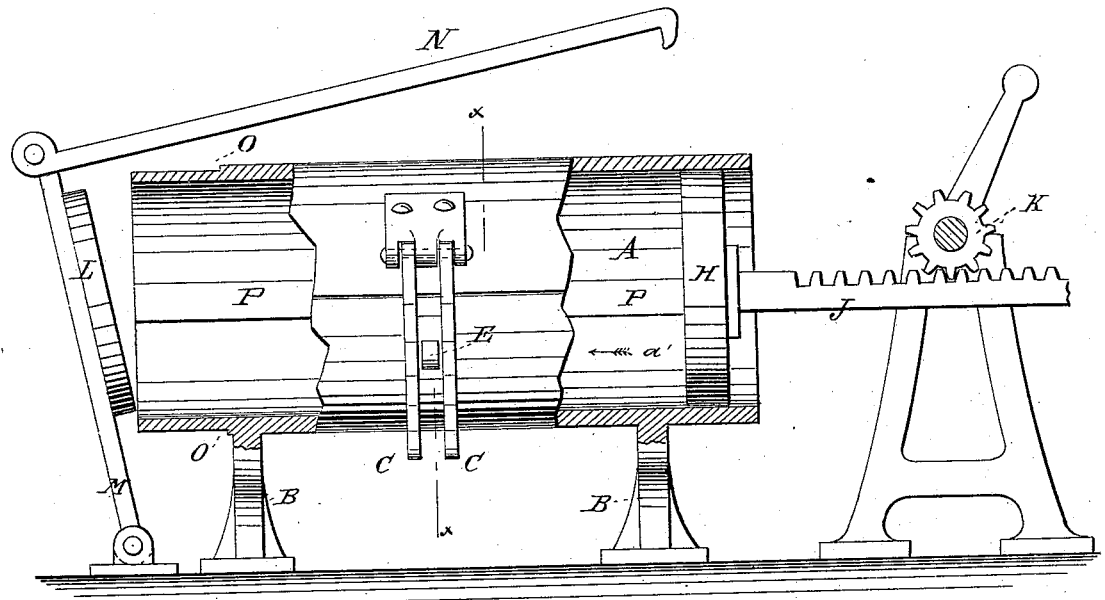
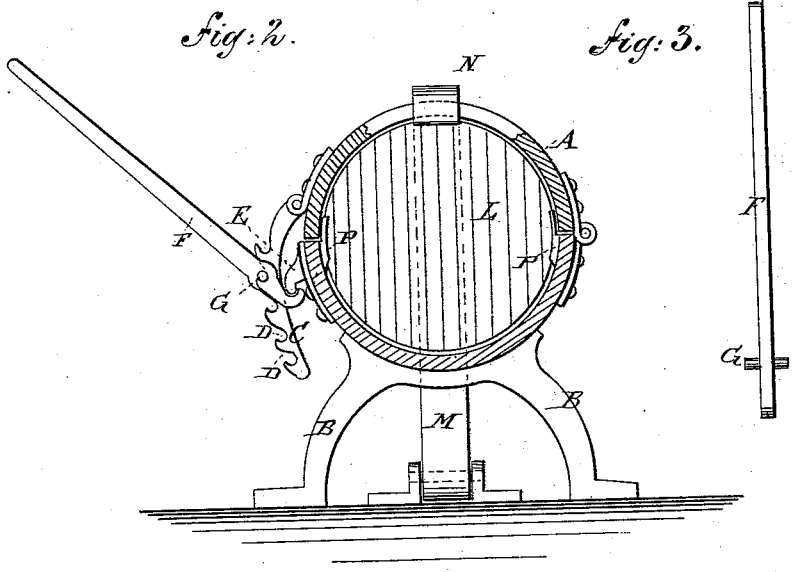
WITNESSES:
Chas. Nias
C. Sedgwick
INVENTOR:
W. Hoefjen
BY Munn & Co.
ATTORNEYS.

UNITED STATES PATENT OFFICE.

WILLIAM HOEFJEN, OF NEW YORK, N. Y.

MACHINE FOR PACKING BONED HAM.

SPECIFICATION forming part of Letters Patent No. 234,983, dated November 30, 1880.

Application filed May 6, 1880. (No model.)

*To all whom it may concern:*

Be it known that I, WILLIAM HOEFJEN, of the city, county, and State of New York, have invented a new and Improved Machine for Packing Boned Ham, of which the following is a specification.

The object of my invention is to provide new and improved machines for packing boned hams and shoulders, whereby the same can be packed more compactly and more rapidly than by hand-labor, as is customary at present.

The invention consists of a cylindrical receptacle, the upper half of which is pivoted on its longitudinal edge, and is provided with a lever-lock, by means of which the lid can be gradually closed, compressing the meat in the cylinder, which meat is then further compressed by closing the front of the cylinder by means of a suitable disk and driving a piston forward, upon which the disk at the front of the cylinder is removed, and an envelope of suitable material is drawn over the front of the cylinder, into which envelope the meat is forced by the piston, which may be operated in any suitable manner.

In the accompanying drawings, Figure 1 is a longitudinal sectional elevation of my improved machine for packing boned meat. Fig. 2 is a cross-sectional elevation of the same, and Fig. 3 is a detail view of the lever used to close the lid of the cylinder for receiving the meat.

The cylindrical receptacle A has its upper half pivoted or hinged on its longitudinal edge on the lower fixed half, which rests on rigid supports B. The upper half of the cylinder is provided with a curved double bar or fork, C, provided with a series of notches, D D, which double bar C is pivoted to the upper part of the cylinder in such a manner that a curved stud or nose, E, attached to the lower part of the cylinder, fits in between the said double bar or fork C.

A lever, F, is provided with a hook, which catches under the nose E at the forward end, and adjacent thereto with a transverse pin or stud, G, which fits in notches D D of the double bar or fork, C. A piston, F, closely fitting into the cylinder, is attached to a rack, J, which is acted upon by a pinion, K, whereby the piston H can be moved forward or backward, as may be desired. A disk, L, fitting into the cylinder A, is attached to a lever, M, pivoted to the base of the machine below the front of the cylinder, and provided with a bar, N, having a hook attached to the end, by means of which hooked bar it can be locked in the front of the cylinder A. The front end of the cylinder is planed down slightly, so as to form a shoulder, O, so that the envelope that is drawn over the front end of the cylinder A can rest against said shoulder. Plates P P, which overlap the longitudinal joints, are attached to the inner side of the cylinder to prevent the meat from being forced out through said joints. The disk L may be secured in the end of the cylinder in any desired manner.

The operation is as follows: Boned ham or any other kind of meat from which the bones have been removed is placed in the lower part of the cylinder A. The stud G of the lever F is then passed into the lowest notch D of the fork C, and the hooked end of the said lever is placed against the under side of the nose E, upon which the said lever is depressed, thereby partially closing the lid part of the cylinder and compressing the meat in the said cylinder. The stud is then passed into the next highest notch, the lever is again depressed until the lid part of the clyinder can be closed, and is then locked in this position by the lever or some suitable latch. The disk L is then secured in the front opening of the cylinder A by resting the hooked end of the bar N against the rear edge of the cylinder. The piston H is caused to move in the direction of the arrow $a'$ by means of the crank and pinion K, whereby the meat in the cylinder is compressed between the wall of the cylinder, the disk L, and the piston H. As soon as the meat has been compressed sufficiently the disk L is removed from the front opening of the cylinder A, and an envelope of any suitable material is passed onto the front end of the said cylinder, which is provided with a shoulder, O, for the purpose of preventing the envelope from being drawn too far. If the piston is now again driven forward the compressed meat will be forced into the envelope, drawing the same off from the cylinder as rapidly as it becomes filled. The envelope is closed in any suitable manner.

I am aware that chopped meat is placed in a cylinder and then forced into sausage-envelopes; but this I do not claim, as I do not chop or cut the meat, but only remove the bones.

Having thus described my invention, I claim as new and desire to secure by Letters Patent—

1. A machine for packing boned meat, made substantially as herein shown and described, and consisting of a cylinder having its upper half hinged on the longitudinal edge and provided with a notched fork, into which a lever for closing said upper part is passed, which cylinder is provided with a disk for closing the front end and with a piston, as set forth.

2. In a machine for packing boned meat, the combination, with the cylinder A, of the notched fork C, the nose E, and the lever F, provided with a cross-stud, G, substantially as herein shown and described, and for the purpose of closing the cylinder and compressing the meat.

3. In a machine for packing boned meat, the combination, with the cylinder A, of the disk L and piston H, substantially as herein shown and described, and for the purpose of compressing the meat.

WILLIAM HOEFJEN.

Witnesses:
OSCAR F. GUNZ,
C. SEDGWICK.